United States Patent [19]

Moller

[11] 4,113,051

[45] Sep. 12, 1978

[54] ENGINE MUFFLER AND SPARK ARRESTER

[75] Inventor: Paul S. Moller, Dixon, Calif.

[73] Assignee: Discojet Corporation, Davis, Calif.

[21] Appl. No.: 728,913

[22] Filed: Oct. 4, 1976

[51] Int. Cl.² .......................... F01N 1/02; F01N 3/02; F01N 3/06

[52] U.S. Cl. .................................... 181/231; 181/239; 181/243; 181/256; 181/265; 181/268; 181/275; 55/276

[58] Field of Search ............... 181/211, 212, 231, 232, 181/239, 249, 250, 251, 252, 256, 267, 269, 265, 268, 275, 257, 281, 243, 258; 55/276, DIG. 30

[56] References Cited

U.S. PATENT DOCUMENTS

| 2,173,549 | 9/1939 | Counda | 181/239 |
|---|---|---|---|
| 2,247,130 | 6/1941 | McCurdy | 181/239 |
| 2,397,556 | 4/1946 | Magill | 181/239 |
| 3,061,416 | 10/1962 | Kazokas | 181/231 |

Primary Examiner—L. T. Hix
Assistant Examiner—Benjamin R. Fuller
Attorney, Agent, or Firm—Lothrop & West

[57] ABSTRACT

A muffler and spark arrester for use on an internal combustion engine has an outer tube extending along an axis between an inlet and an outlet. A perforate inner tube is disposed coaxially within the outer tube and merges therewith adjacent the inlet and is in effect connected thereto near the outlet by a partially toroidal end wall. Sound absorbing material is lodged between the inner and outer tubes. A plurality of nested, partially toroidal cups is disposed coaxially adjacent the end wall. A resonator-arrester chamber is coaxially nested with the toroidal cups. A central tube is held by a gas barrier wall coaxially within a portion of the inner tube. The parts are held together by an axially extending through bolt.

6 Claims, 6 Drawing Figures

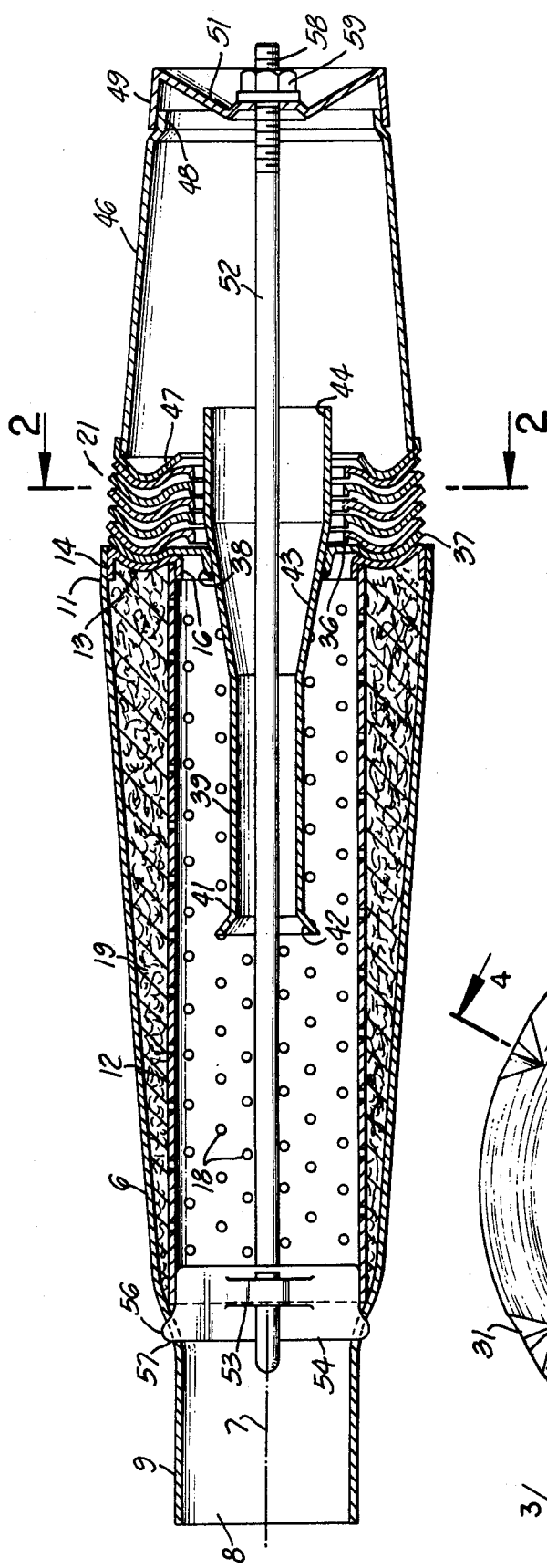
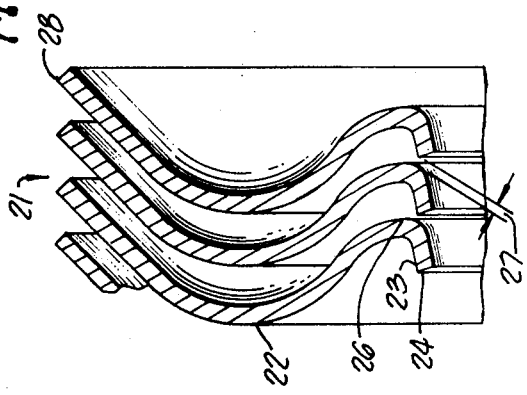
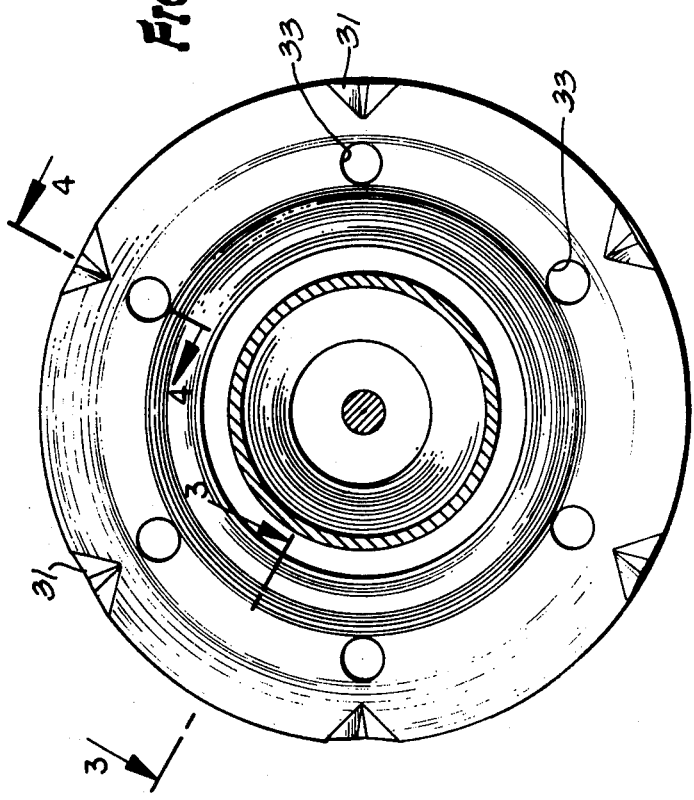

ENGINE MUFFLER AND SPARK ARRESTER

CROSS-REFERENCES TO RELATED APPLICATIONS, IF ANY

Reference is made to this applicant's technically related application Ser. No. 562,023 filed Mar. 26, 1975 and now U.S. Pat. No. 3,987,867 issued Oct. 26, 1976.

BRIEF SUMMARY OF THE INVENTION

A muffler and spark arrester for an internal combustion engine, the exhaust of which carries glowing carbon particles and the like, includes an enclosure arranged along an axis of symmetry. The enclosure includes an inner tube which is perforated and is coaxially located within an outer tube spaced therefrom in a tapering fashion with sound absorbent material therebetween. At the outlet end of the inner and outer tubes there is an end, gas barrier wall with a partially toroidal, concave configuration against which nests a plurality of partially toroidal discs slightly spaced apart by edge dimples. Adjacent the discs and at the end of the device is a resonator-arrestor chamber adapted to retain particulates and held in position with the rest of the parts by a through bolt. Partly within the inner tube and also partly within the nested cups is a central tube of a tapered nature relatively small near its flared inlet and relatively large near its cylindrical outlet. The central tube is supported coaxially by a gas barrier plate nested between the end wall and an adjacent cup.

BRIEF DESCRIPTION OF THE SEVERAL VIEWS OF THE DRAWING

FIG. 1 is a cross-section on a longitudinal plane through one form of an engine muffler and spark arrester constructed pursuant to the invention.

FIG. 2 is a cross-section to an enlarged scale, the plane of which is indicated by the line 2—2 of FIG. 1.

FIG. 3 is an enlarged detail showing the arrangement of the partially toroidal cups.

DETAILED DESCRIPTION

Figure 6:
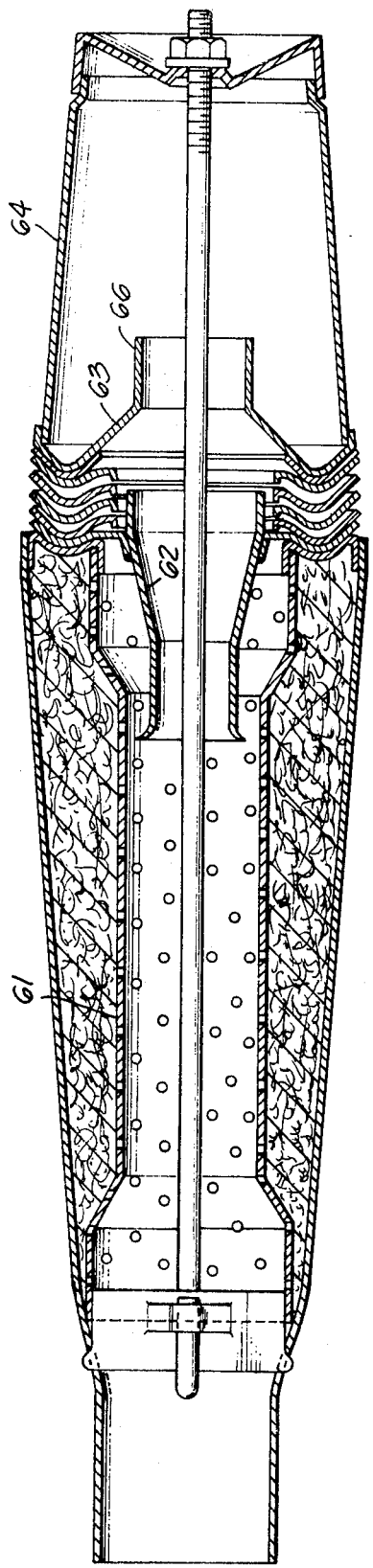
FIG. 6 is a longitudinal cross-section, like FIG. 1, but showing a modified form of the device.

In connection with the exhaust from an internal combustion engine, there is always the desideratum to provide a relatively low level of exhaust noise without seriously interfering with exhaust outflow. In fact, it is preferred to reduce the back pressure at the exhaust, if possible, while attenuating the inherent exhaust sound. In addition, for some environments, particularly on forest trails and the like, there is a strict requirement that emission of glowing particles from the exhaust be restricted to particles of such a small size that they are virtualy extinguished or are absolutely extinguished after leaving the engine and before being able to touch the ground or any of the surroundings. Various arrangements have been provided for this purpose. One, for example, is shown in the present applicant's application Ser. No. 562,023 filed Mar. 26, 1975 and now U.S. Pat. No. 3,987,867 issued Oct. 26, 1976. There is a requirement for continued improvement in this field as there is greater and greater emphasis on the retention of carbon particles and there are wider prohibitions of emission of such particles at any time as might be likely to start fires. There is also the general requirement that a muffling and spark arresting device be relatively simple and inexpensive so that it can be widely used and so that it can easily be maintained and cared for, as many users are technically or mechanically unskilled.

In earlier devices used on engines burning leaded fuels, it has been noted that lead often builds up on muffler surfaces to an extent to impede the flow of the exhaust gases. It is a desideratum or even a requirement to overcome such deleterious build-up of lead from the fuel.

Another requirement is to provide an arrangement so that sparks which otherwise would be emitted are retained but can periodically be removed without substantial difficulty.

It is therefore an object of the invention to provide an engine muffler and spark arrester which meets all of the foregoing requirements and is a substantial advance over devices heretofore available.

In a preferred form of the arrangement, as shown particularly in FIGS. 1–5 inclusive, there is afforded a muffler and spark arrester which has an outer tube 6 symmetrical about a longitudinal axis 7 and of generally tapering configuration or frusto-conical in aspect. At one end, the inlet end 8, the device has a substantially circular-cylindrical portion 9 designed to interfit with the exhaust pipe of an internal combustion engine. The manner of attachment of the muffler to the engine is presently immaterial, except that it should be without any substantial leaks, an appropriate joint including a clamp or the like normally being provided. The outer tube 6 is largely frusto-conical and expands from a region adjacent the inlet to a generally circular-cylindrical outlet portion 11.

Within the tube 6 there is an inner tube 12 of generally circular-cylindrical form symmetrical about the axis 7 and at its inlet end having a diameter only slightly less than that of the outer tube so that the two fit together well. The inner tube make a close fit with or is secured to the outer tube near the inlet. Near the outlet the inner tube overlies an end wall 13 spanning the annular space between the inner tube and the outer tube. The end wall has inturned flanges 14 and 16 for close interfitting or even fastening of the tubes and end wall. The end wall 13 is an annulus symmetrical about the axis 7 and having a partially toroidal form, including a concave intermediate section 17. The term "partially toroidal" is not an exact mathematical designation but is intended to define a configuration which is similar to or like that of a portion of a torus on one side of a median plane normal to the axis of the torus or like a ring having an annular groove.

The inner tube 12 is not solid or continuous, as is the outer tube, but rather is provided with a number of perforations 18 therein. These are evenly spaced over most of its extent and afford communication between the interior of the inner tube and the interior of the outer tube. The intervening space 19 is preferably filled with sound attenuating or sound absorbing material; for example, fiber glass or the like.

Overlying the end wall 13 is a plurality of nested, partially toroid cups 21, as illustrated to larger scale in FIG. 3. These cups are arranged partly to nest one within the other and to have a concave portion 22 substantially matching the concave portion 17 of the end wall 13. Adjacent their inner diameters the cups are provided with inclined flanges 23 so arranged that the edge 24 of one flange is spaced from the adjacent wall 26 of the adjacent flange. This leaves an annular opening 27 therebetween of a predetermined dimension. This size is substantially that of the largest particle that is to be permitted to escape from the device. Particles that are larger cannot pass through the opening 27, whereas particles that are smaller can freely pass therethrough. The flanges 23 are turned in the general direction of the inlet to the muffler, whereas the outer edges 28 of the cups are inclined toward the direction of the outlet of the muffler, the spaces between the individual discs at the outlet or adjacent outer edges being much larger than the openings 27 near the inlet edges.

The thickness of the flange material and the upstream direction of the edges 24 of the cups are such that whatever entrained lead in the exhaust gas is intercepted is deposited on the edges 24 themselves and the only thereon for they form substantially the only impact surfaces. It has been noted that the lead erosion rate by passing gases usually equals the lead deposit rate, after some build-up, so this arrangement does not suffer from lead blocking and the gas passages remain free and of substantially original dimensions.

Figure 5:
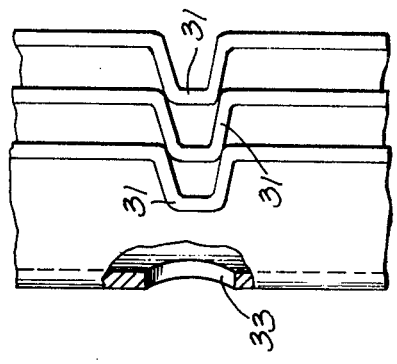
FIG. 5 is a partial side view, the plane of the view being indicated by the line 5—5 of FIG. 4.
Figure 4:
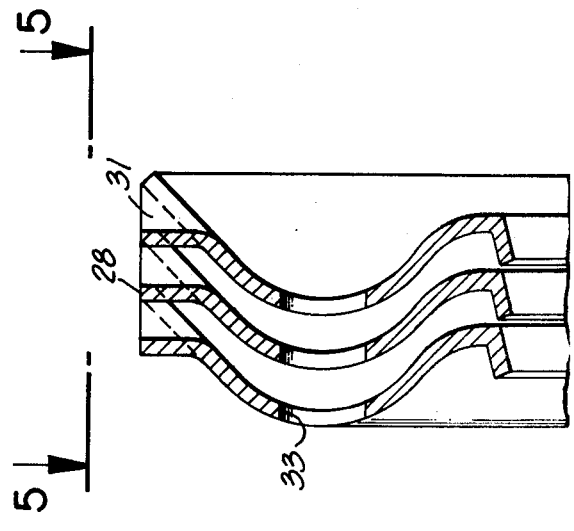
FIG. 4 is a cross-section, the plane of which is indicated by the line 4—4 of FIG. 2.

The space relationship is maintained, as especially shown in FIGS. 2, 4 and 5, by a number of dimples 31 indenting the outer edges 28 of the individual cups and arranged, as shown in FIG. 5, to nest in a wedging fashion. That is, a number of partially toroidal cups can be arranged coaxially with the dimples interengaging or interlocking so that a packet is made of the desired array and with the desired spacing between cups and with the cups held against shifting transversely. Since each one of the cups is just like the others it is possible to assemble an array of any number of cups, depending upon the desired capacity of the muffler and depending upon the amount of exhaust area required.

As shown particularly in FIG. 2, the cups may also have a number of apertures 33 through them, especially through the concavities 22, so that there can be some straight flow or pressure equalization in the cup region. However, there is no possibility of large solid particles passing therethrough because there is interposed between the end wall 13 and the first adjacent cup 21 a gas flow barrier 36. This is a solid, imperforate member. The barrier 36 has an outer portion 37 of the same general configuration as the partial toroids nested on either side of it and has an interior flange 38 designed to be fastened to and support a coaxially arranged central tube 39. This central tube has a relatively small entrance end 41 with an out-turned or flared flange 42, next has a cylindrical portion, then has an intermediate enlargement 43 and has a generally circular-cylindrical larger end 44 passing substantially entirely through the nested group of discs or cups. The central tube 39 is relatively long and narrow to provide gas flow inertia and also incorporates a flared or diffusing section 43 so that most of the kinetic energy in the gas is recovered in one direction of flow. This is not true for the backward direction of flow, so back flow is inhibited by the central tube, and there is a resulting reduction of dissipated sound. As an example only, the configuration of FIG. 1 is especially effective as a sound attenuator between about 250-750 Hertz.

Coaxially arranged and surrounding the outlet of the central tube 39 is a resonator-arrester chamber 46 having at one end a wall 47 shaped very much like an adjacent one of the cups 21 and designed to interfit therewith. This is joined by welding, for example, to the chamber wall 46. The wall 46 is preferably necked down at its outer end 48 to receive the flange 49 of a closure cap 51.

To hold all of these parts in the proper axially spaced and concentrically arranged position, there is a fastening means including a through bolt 52. At its inner or upstream end, this bolt passes through a gap 53 in a split, diametrically extending vane 54 having ears 56 lodged in small slits 57 in the tube 6. The central rod is secured in the vane 54 against axial movement and at its opposite end is provided with threads 58 receptive of a nut 59. With this arrangement all of the parts can be assembled coaxially, the nesting portions of the cups, the end wall 13 and the barrier wall 47 as well as the gas barrier 36 substantially aligning themselves. When the nut 59 is tightened on the rod 52, the entire muffler and spark arrester is maintained firmly in position.

In use, exhaust gas with its attendant particles, usually glowing carbon, comes in through the inlet, travels through the inner tube and has some of the sound attenuated by passage through the openings into fiber glass in the surrounding space 19. The gas then exhausts through the narrow portion of the central tube 39 and passes into the resonator-arrester 46. The light gas makes a sharp U-turn back upon itself, whereas the relatively heavy glowing particles or sparks are deposited in the chamber 46. The exhausting gases then travel in a reverse direction through the interior of the nested cups, being prevented from traveling farther backward by the intervening gas barrier wall 36. The gases then must pass through the relatively narrow annular openings 27 between the successive discs 21, only very small particles being passed along with the gas. The gases then expand radially outwardly and travel through the sinuous pathway afforded by the nested, partially toroid cups and finally discharge in conical patterns from the outer openings between the outer edges 28 of the nested cups.

After prolonged use a number of particles may be trapped within the chamber 46. If that is true then the nut 59 is easily removed, and the end cap 51 is taken off. If the particles cannot then be easily discharged, the wall 46 itself is removed and shaken out and emptied. The parts are then reassembled in their initial condition, and when the nut 59 is again tightened the muffler is available for further sound attenuation and spark gathering duties.

As shown in FIG. 6, there is a modification of this arrangement in that similar parts are utilized with somewhat different proportions or scales for sound attenuation in engines of different character. In addition, the inner tube 61 has a special configuration. This allows for higher gas velocity and adtitional attenuating material. The gas flows toward a specially provided cntral tube 62 somewhat shorter than before, terminating within the axial extent of the nested cups 21. Furthermore, the wall 63 which closes the inner end of the resonator-arrester chamber 64 is extended to provide a short resonator tube 66.

While the general function and operation of the FIG. 6 device is the same as the device of FIGS. 1-5, the FIG. 6 device is designed for greater or different frequency rejection, being, for example, particularly effective between 500-2000 Hertz. The gas inflow is as previously described, through the perforated inner tube 61 and then through the relatively short central tube 62. Some of the gas can virtually short circuit into the nested cups. Some of the sound reverberates wihin the interior of the chamber 64 but is attenuated and flows out with the gas through the resonator tube 66 and the cups. Any particles that flow into the chamber 64 with substantial velocity deposit therein and do not flow back toward the outlet. The cups are as previously described and permit the passage only of particles under the maximum size permitted for exhaust.

In both instances there is provided an engine muffler and spark arrester effective substantially to attenuate the exhaust sound of an internal combustion engine without providing back pressure thereon and often allowing a lower exhaust pressure than without the muffler. Furthermore, exhaust particles are retained and are not permitted to discharge to the outside unless they are well under the size limit permitted to discharge without endangering the environment.

I claim:

1. An engine muffler and spark arrester comprising an outer tube extending along an axis and having an inlet and an outlet; a partially toroidal end wall having an axial opening therein, said end wall engaging and seated against an end of said outer tube adjacent said outlet; a plurality of substantally identical, nested, partially toroidal cups disposed coaxially adjacent said end wall, each of said cups having in cross-section in a plane containing said axis a substantially S-shape with the radially inner edge of each of said cups directed toward said end wall and with the radially outer edge of each of said cups directed away from said end wall; a resonator-arrester chamber disposed coaxially with said cups and having an open end disposed against the end one of said cups and having a closed end disposed remote from said cups; and means for securing said outer tube, said cups and said resonator-arrester chamber together.

2. A device as in claim 1 including means on the outer edges of said cups for spacing said cups axially apart at their inner edges and their outer edges, said edges being positioned by said means on said outer edges to define annular gaps between successive cups with a predetermined dimension between one cup inner edge and the wall of an adjacent cup.

3. A device as in claim 2 in which said cups at their inner edges have abruptly inturned flanges directed upstream.

4. A device as in claim 2 in which said cups have axial spacing means in the form of nested dimples on their outer, peripheral edges.

5. A device as in claim 1 in which said securing means includes a coaxial rod extending through said closed end closure cap, said plurality of cups and said outer tube; and means at an upstream location in said outer tube for engaging said rod.

6. A device as in claim 4 in which said dimples are the sole axial spacing means for said cup.

* * * * *